US012650408B2

(12) United States Patent
Druet et al.

(10) Patent No.: US 12,650,408 B2
(45) Date of Patent: Jun. 9, 2026

(54) CALIBRATION METHOD FOR GUIDED ELASTIC WAVE TOMOGRAPHY ADAPTED TO CYLINDER-TYPE STRUCTURES

(71) Applicant: COMMISSARIAT A L'ENERGIE ATOMIQUE ET AUX ENERGIES ALTERNATIVES, Paris (FR)

(72) Inventors: Tom Druet, Gif-sur-Yvette (FR); Tinh Hoang Huu, Massy (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 574 days.

(21) Appl. No.: 18/028,441

(22) PCT Filed: Sep. 23, 2021

(86) PCT No.: PCT/EP2021/076145
§ 371 (c)(1),
(2) Date: Mar. 24, 2023

(87) PCT Pub. No.: WO2022/063871
PCT Pub. Date: Mar. 31, 2022

(65) Prior Publication Data
US 2023/0333062 A1 Oct. 19, 2023

(30) Foreign Application Priority Data
Sep. 23, 2020 (FR) ...................................... 2009659

(51) Int. Cl.
| | | |
|---|---|---|
| *G01N 29/06* | (2006.01) | |
| *G01N 29/30* | (2006.01) | |
| *G01N 29/44* | (2006.01) | |

(52) U.S. Cl.
CPC ......... *G01N 29/0672* (2013.01); *G01N 29/30* (2013.01); *G01N 29/4472* (2013.01); *G01N 2291/023* (2013.01); *G01N 2291/106* (2013.01)

(58) Field of Classification Search
CPC ............... G01N 29/0672; G01N 29/30; G01N 29/4472; G01N 2291/023;
(Continued)

(56) References Cited

FOREIGN PATENT DOCUMENTS

WO WO-2016008100 A1 * 1/2016 ............... G01V 1/28

OTHER PUBLICATIONS

English machine translation of Yang (WO 2016008100 A1) (Year: 2016).*
(Continued)

*Primary Examiner* — Walter L Lindsay, Jr.
*Assistant Examiner* — Geoffrey T Evans
(74) *Attorney, Agent, or Firm* — BakerHostetler

(57) ABSTRACT

A method for performing tomography on a structure supporting modes of guided propagation of elastic waves, the method includes the steps of: acquiring a plurality of signals propagating through the structure by means of a plurality of pairs of non-collocated elastic-wave sensors; for each pair of sensors, i. selecting one mode of guided propagation, ii. converting the measured signal into wave field for the selected mode, iii. determining an anisotropic calibration coefficient on the basis of a wave-field propagation model evaluated depending on the anisotropic wavenumber and on the distance between the sensors of the pair, and on the basis of the wave field or of a reference wave field corresponding to a healthy state of the structure, calibrating the wave fields using the determined calibration coefficients, performing tomography on the structure on the basis of the calibrated wave fields.

15 Claims, 13 Drawing Sheets

(58) Field of Classification Search
    CPC ..... G01N 2291/106; G01N 2291/0258; G01N
                    2291/105; G01N 2291/2634; G01N
                2291/2636; G01N 29/043; G01N 29/4436
    See application file for complete search history.

(56)                    References Cited

OTHER PUBLICATIONS

Druet, Tomographie passive par ondes guidées pour des applications de contrôle santé intégré [Passive guided-wave tomography for integrated-health-monitoring applications], Thesis, 2018.
Druet, et al., "Autocalibration method for guided wave tomography with undersampled data", Wave Motion, vol. 89, pp. 265-283, 2019.
Willey, et al., "Guided wave tomography of pipes with high-order helical modes", NDT & E International, vol. 65, pp. 8-21. Jul. 2014.
Brath, et al., "Acoustic formulation of elastic guided wave propagation and scattering in curved tubular structures", IEEE Transactions on Ultrasonics, Ferroelectrics, and Frequency Control, vol. 61, Issue: 5, pp. 815-829, May 2014.

* cited by examiner

Tube

Dérouler coupe axiale

θ

$\vec{k}_\theta$

2πR coupe axiale

Analogie de plaque

CALIBRATION METHOD FOR GUIDED ELASTIC WAVE TOMOGRAPHY ADAPTED TO CYLINDER-TYPE STRUCTURES

CROSS-REFERENCE TO RELATED APPLICATIONS

This application is a National Stage of International patent application PCT/EP2021/076145, filed on Sep. 23, 2021, which claims priority to foreign French patent application No. FR 2009659, filed on Sep. 23, 2020, the disclosures of which are incorporated by reference in their entirety.

FIELD OF THE INVENTION

The invention relates to the field of non-destructive testing of mechanical structures or of integrated health monitoring, and more specifically to methods for performing tomography on such structures with the aim of detecting the presence of defects.

The invention more specifically relates to a method for performing diffraction tomography comprising a calibration mechanism that is particularly suitable for imaging of structures forming cylinders, in particular cylinders of small size.

BACKGROUND

The invention is for example, but not exclusively, applicable to the inspection of pipes or penstocks, in particular in the field of gas transportation, in the nuclear field or in the hydraulic field.

The document "*Autocalibration method for guided wave tomography with undersampled data* (Druet, Tastet, Chapuis, Moulin, 2019)" describes a method for performing tomography using guided waves that is based on an approximated propagation model, which method achieves satisfactory results when sheet-like planar structures are imaged.

The proposed method includes autocalibration of the data (before tomography), a reference state of the healthy structure (which is not necessarily available) not needing to be known.

One advantage of this method is that it allows measurements to be taken that remain robust over time, unlike a calibrating method based on a reference state. Specifically, the measurements of a calibrating method based on a reference state may become obsolete if environmental conditions (for example temperature or the response of a sensor) change over time.

The propagation model described in the aforementioned document is used to calibrate the measurements taken by the sensors, in order to obtain the best possible fit to the imaging model used and to compensate for the fact that sensor responses are in practice different from one another (for example as a result of the coupling between the sensors and structure differing depending on the sensor).

The aforementioned autocalibrating method is a so-called single-mode method. The propagation of the mode used is considered isotropic. This is the case for sheet-like structures. In contrast, in the case of cylindrical structures, in particular cylindrical structures of small diameters, this approximation is no longer valid and leads to production of images that are of lower quality or even completely erroneous.

Specifically, in the case of a cylinder, the larger the circumferential distance between the two sensors of an emitter/receiver sensor pair on the cylinder, the larger the error between the actual dispersion curves and the dispersion curves of the approximate propagation model for this sensor pair.

Moreover, the longer the wavelength (or the lower the frequency of the signal) with respect to the diameter of the cylinder, the larger the error.

The invention provides an improvement to the method for performing guided-wave-based tomography without a reference state as described in the document "*Autocalibration method for guided wave tomography with undersampled data* (Druet, Tastet, Chapuis, Moulin, 2019)", allowing structures forming cylinders, in particular cylinders of small diameters, to be imaged.

SUMMARY OF THE INVENTION

One subject of the invention is a method for performing tomography on a structure supporting modes of guided propagation of elastic waves, the method comprising the steps of:

acquiring a plurality of signals propagating through the structure by means of a plurality of pairs of non-collocated elastic-wave sensors;

for each pair of sensors,
   i. selecting one mode of guided propagation,
   ii. converting the measured signal into wave field for the selected mode,
   iii. determining an anisotropic calibration coefficient on the basis of a wave-field propagation model evaluated depending on the anisotropic wavenumber and on the distance between the sensors of the pair, and on the basis of said wave field or of a reference wave field corresponding to a healthy state of the structure, calibrating the wave fields using the determined calibration coefficients, performing tomography on the structure on the basis of the calibrated wave fields.

According to one particular aspect of the invention, the anisotropic calibration coefficient is equal to the ratio between the propagation model of the wave field and the reference wave field and the calibrating step is carried out by multiplying each wave field by the associated anisotropic calibration coefficient.

According to one particular aspect of the invention:
the anisotropic calibration coefficient is equal to the ratio between the wave-field propagation model and the measured wave field, the method further comprising a step of identifying pairs of sensors for which the measured signal corresponds to a path that does not intercept a defect in the structure, these pairs being designated healthy pairs, the calibrating step being carried out by multiplying each wave field by the average of the anisotropic calibration coefficients computed for the healthy pairs.

According to one particular aspect of the invention:
the anisotropic calibration coefficient is equal to the ratio between the wave-field propagation model and the measured wave field, the method further comprising a step of identifying pairs of sensors for which the measured signal corresponds to a path that does not intercept a defect, these pairs being designated healthy pairs, the calibrating step being carried out by multiplying each wave field corresponding to a healthy pair by the associated anisotropic calibration coefficient and by multiplying the other wave fields by the average of the anisotropic calibration coefficients computed for the healthy pairs.

According to one particular aspect of the invention, the step of performing tomography is anisotropic.

According to one particular aspect of the invention, the calibrating step further comprises:

computing a corrective factor equal to the ratio between the wave-field propagation model evaluated as a function of the isotropic wavenumber of the fundamental mode and the wave-field propagation model evaluated as a function of the anisotropic wavenumber, multiplying each calibrated wave field by the associated corrective factor.

According to one particular aspect of the invention, the step of performing tomography is isotropic.

According to one particular aspect of the invention, the step of identifying healthy pairs is carried out by means of time-of-flight tomography imaging.

According to one variant of embodiment, the method according to the invention further comprises determining a confidence ellipse on the basis of the set of calibration coefficients computed for the healthy pairs, pairs corresponding to calibration coefficients located outside the confidence ellipse being excluded from the healthy pairs.

According to one particular aspect of the invention, the wave-field propagation model is given by a solution of the Helmholtz equation for a pulsed emitter source that depends on the product between the wavenumber and the distance between the sensors of a pair.

According to one particular aspect of the invention, the anisotropic wavenumber is determined via numerical solution on the basis of the direction of propagation of the wave associated with the pair of sensors.

According to one particular aspect of the invention, the structure is a cylinder.

Another subject of the invention is a device for performing tomography, comprising an array of elastic-wave sensors that are intended to be positioned on a surface of a structure to be imaged and a processing unit that is able to receive the signals acquired by the sensors and that is configured to execute the steps of the method for performing tomography according to the invention.

According to one particular aspect of the invention, the elastic-wave sensors are chosen from piezoelectric transducers, electromagnetic acoustic transducers and fiber-Bragg-grating sensors.

According to one particular aspect of the invention, the elastic-wave sensors are able to operate in a so-called active or passive acquisition mode.

BRIEF DESCRIPTION OF THE DRAWINGS

Other features and advantages of the present invention will become more apparent on reading the following description with reference to the following appended drawings.

DETAILED DESCRIPTION

Guided elastic-wave tomography is a single-mode imaging method, this meaning that a guided mode to be used to perform imaging must be selected.

Figure 1A:
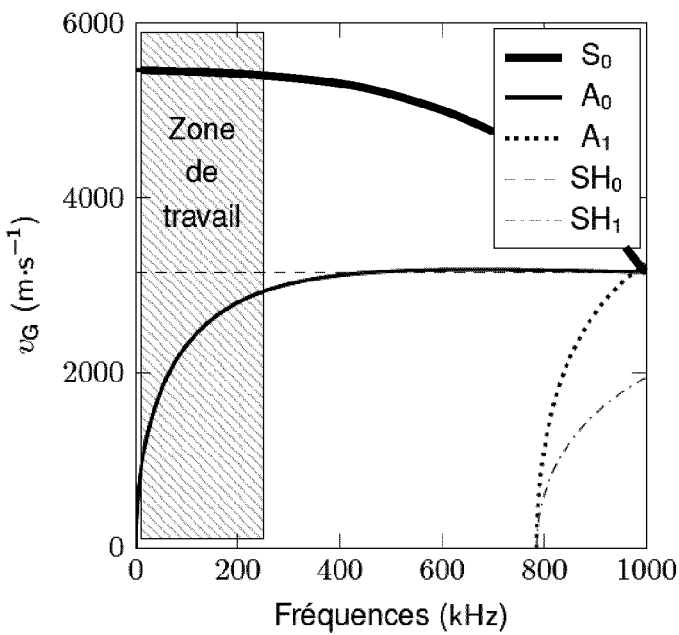
FIG. 1a shows one example of dispersion curves of guided waves in a sheet-like structure showing group velocity as a function of frequency.
Figure 1B:
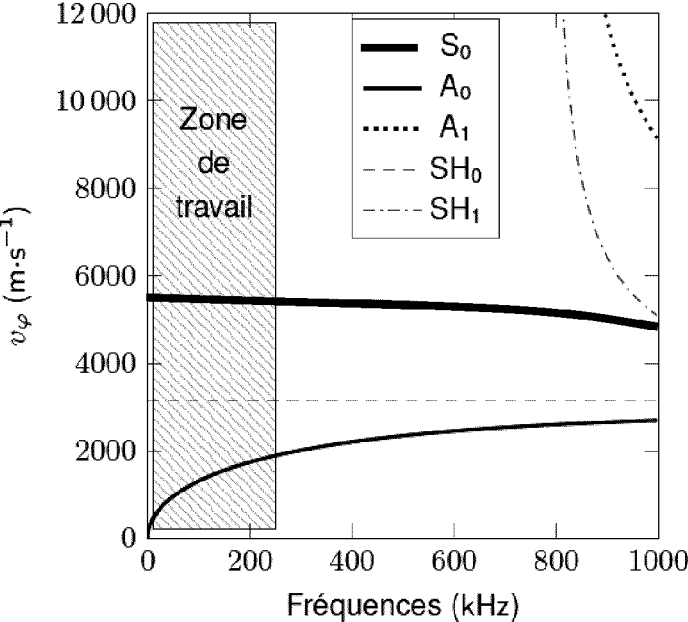
FIG. 1b shows one example of dispersion curves of guided waves in a sheet-like structure showing phase velocity as a function of frequency.

A guided mode is characterized by a dispersion curve. FIGS. 1a and 1b show two types of dispersion curves for various guided modes in a sheet-like planar structure, respectively. FIG. 1a shows curves of group velocity as a function of frequency for the modes $S_0$, $A_0$, $A_1$, $SH_0$, and $SH_1$, and FIG. 1b shows curves of phase velocity as a function of frequency for the same modes.

Figure 2A:
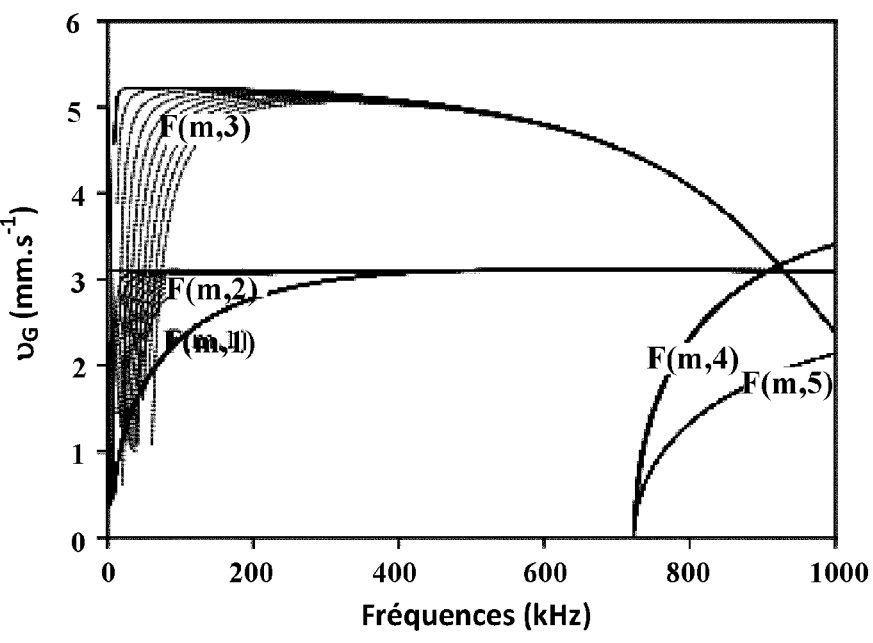
FIG. 2a shows one example of dispersion curves of guided waves in a cylinder-like structure showing group velocity as a function of frequency.
Figure 2B:
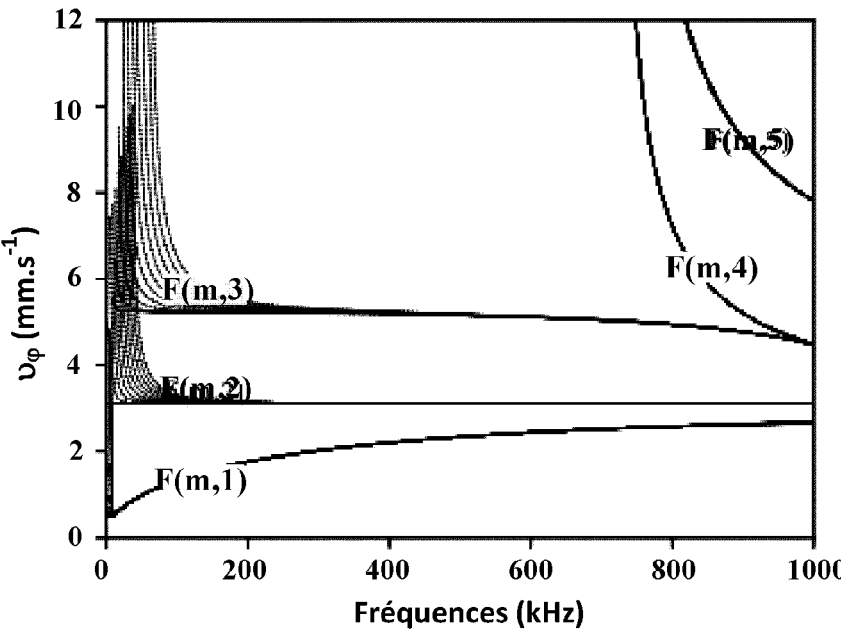
FIG. 2b shows one example of dispersion curves of guided waves in a cylinder-like structure showing phase velocity as a function of frequency.

In the case where the structure to be imaged is not planar but tubular (cylinder-like), the guided modes form families of modes having similar properties and are represented by families of dispersion curves. This is illustrated in FIGS. 2a and 2b, which show group velocity and phase velocity as a function of frequency for various families of modes $F(m,1)$, $F(m,2)$, $F(m,3)$, $F(m,4)$, and $F(m,5)$, respectively.

Figures 3, 4:
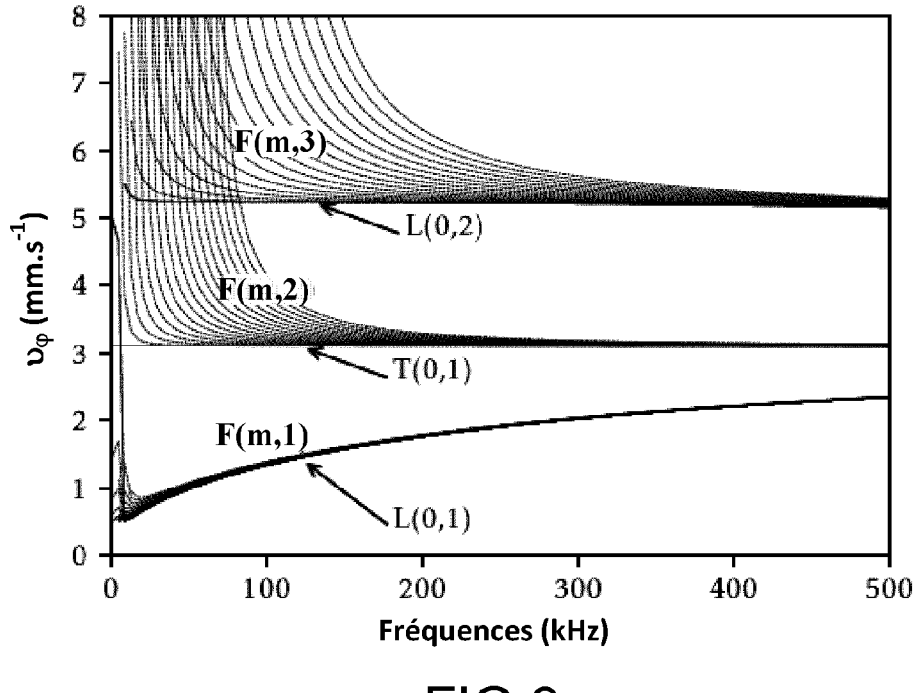
FIG. 3 shows the fundamental mode chosen for three families of modes of guided waves in a cylinder-like structure.
FIG. 4 shows a perspective view of a cylinder and a view of the surface of the cylinder rolled out in analogy to a sheet.

To be able to apply single-mode tomography, it is thus necessary to approximate a whole family of modes by the fundamental mode, as shown in FIG. 3 in which the fundamental mode $L(0,1)$, $T(0,1)$, $L(0,2)$ chosen for three families of modes $F(m,1)$, $F(m,2)$, $F(m,3)$ has been identified.

To apply the method for performing single-mode tomography described in the document "*Autocalibration method for guided wave tomography with undersampled data* (Druet, Tastet, Chapuis, Moulin, 2019)" for a sheet, to a cylinder, the cylinder is represented in a "rolled out" form, to make an analogy to a sheet.

FIG. 4 shows this analogy.

The wave fronts may then be represented for each propagation angle $\theta$. The first three propagation angles corresponding to the first three modes of the chosen family are shown in FIG. 5.

Figure 5:
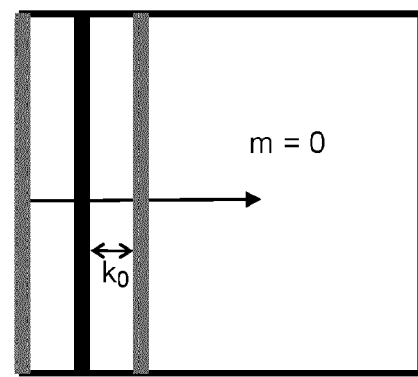
FIG. 5 shows a diagram of the wave front of the first three modes of a chosen family of modes.
Figure 5:
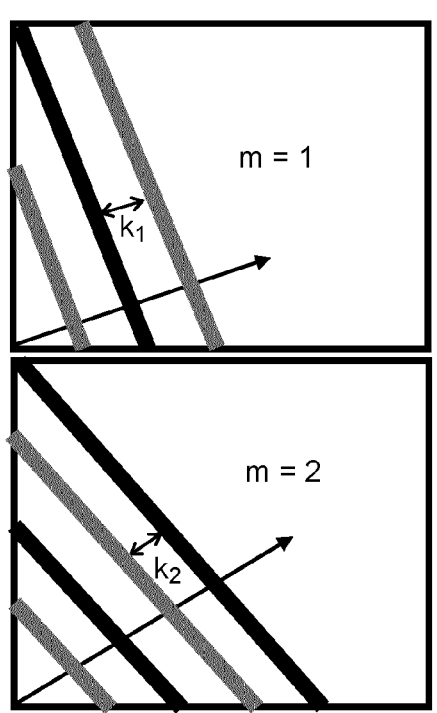

In fact, each of the wavenumbers corresponding to the various modes shown in FIG. 5 are different:

$$k_0 \neq k_1 \neq k_2 \neq k_m$$

to apply single-mode tomography, these wavenumbers are approximated by the fundamental wavenumber $k_0$.

$$k_0 \approx k_1 \approx k_2 \approx k_m$$

It is then sought to identify for which cylinder configurations this approximation is valid.

Figure 6:
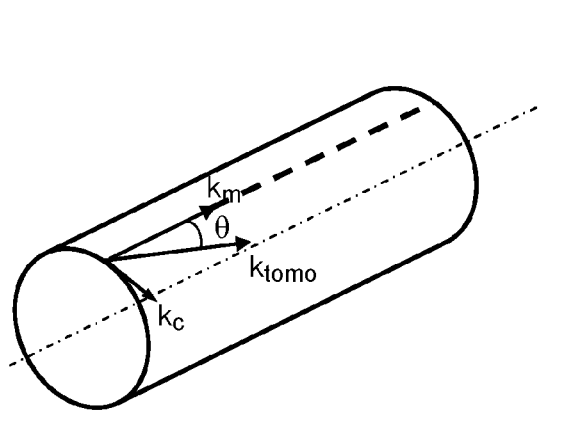
FIG. 6 shows a diagram illustrating an approximation of the chosen mode family by the fundamental wavenumber $k_0$.
Figure 6:
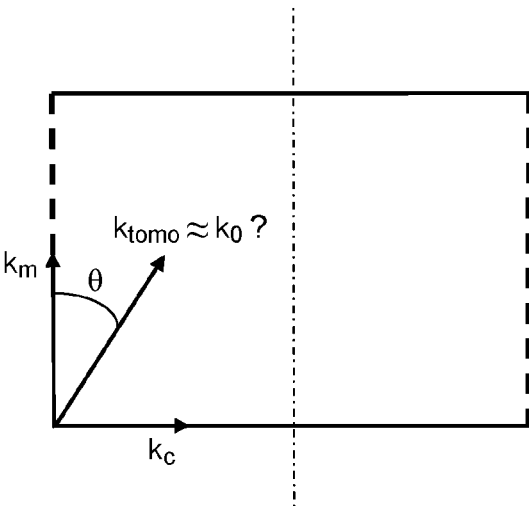

FIG. 6 schematically shows the approximation of the selected mode family by the fundamental wavenumber $k_0$.

The continuity equation $m\lambda_c = 2\pi R \ \forall m > 0$, where $\lambda_c$ is the circumferential wavelength and R is the radius of the cylinder, allows the wavenumber $$k_c = \frac{m}{R}$$

to be expressed.

The wavenumber $k_m$ is then expressed using the following relationship:

$$k_m = \pm\sqrt{k_0^2 - \left(\frac{m}{R}\right)^2}$$

It is then possible to compare the dispersion curves obtained using the simplified model represented by the above equation with the dispersion curves obtained numerically.

Figure 7A:
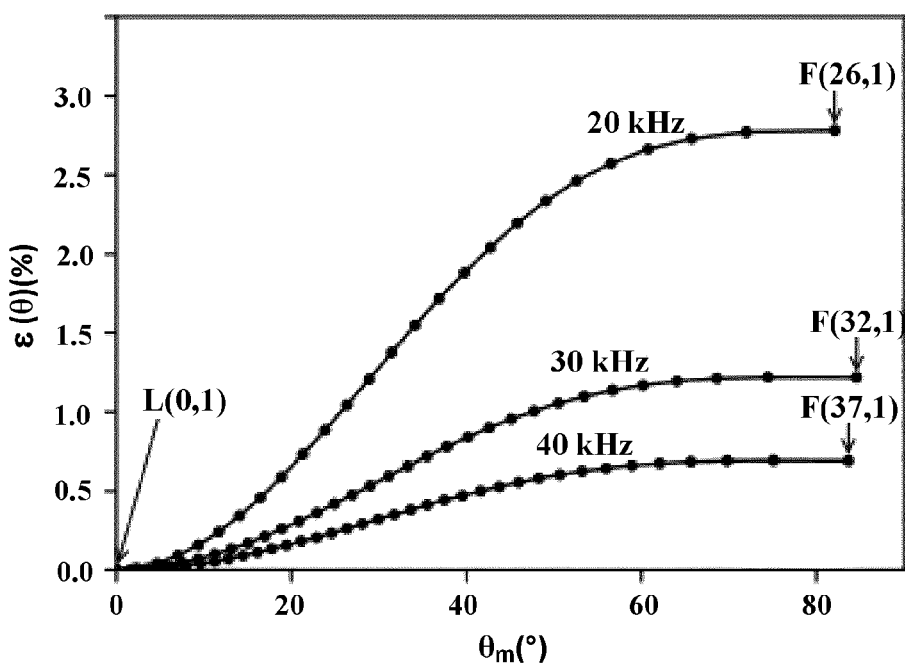
FIG. 7a shows a diagram of the error between a simplified model and actual dispersion curves for various frequencies.
Figure 7B:
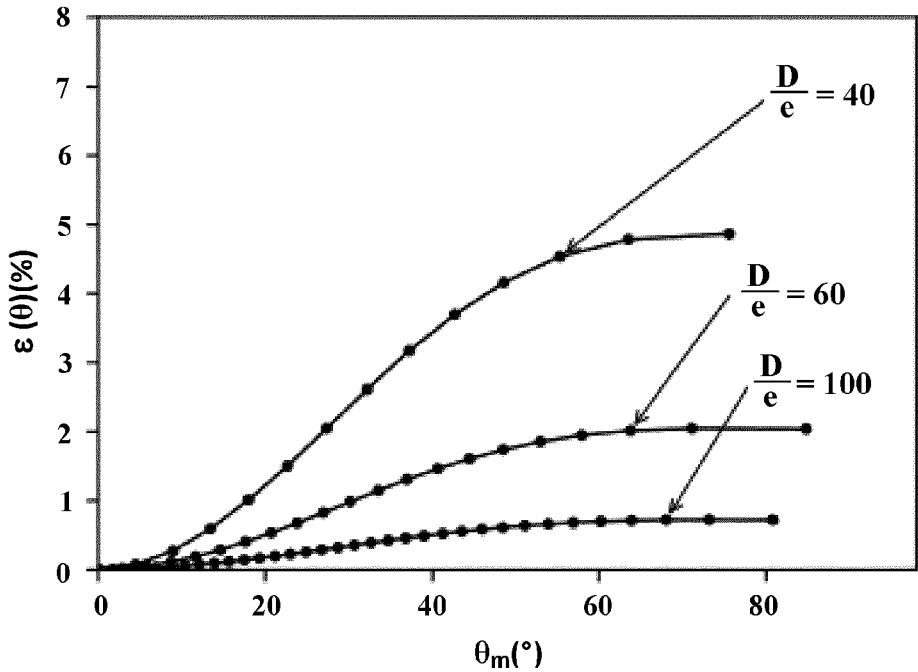
FIG. 7b shows a diagram of the error between a simplified model and actual dispersion curves for various cylinder diameter/thickness ratios.

FIGS. 7a and 7b show the resulting error (in %) as a function of propagation angle $\theta_m$ for various frequencies and for various ratios between the diameter $\phi$ of the cylinder and its thickness e, respectively.

It may be seen from these figures that, for the chosen family of modes, the larger the angle $\theta_m$, the larger the error, and that the error is zero for an angle of zero, this being logical given that it was chosen to represent the whole family of modes by the fundamental mode (m=0, wave front perpendicular to the axis of the cylinder).

In addition, the lower the frequency (long wavelengths), the larger the error (effect of the curvature of the cylinder substantial), and the smaller the diameter, the larger the error. This shows, although only qualitatively, that the isotropic model used to image a sheet is not suitable for imaging small cylinders at low frequency.

For this reason, a method suitable for this type of structure needs to be developed. This is the object of the present invention.

The principles of calibration of measurements carried out by single-mode guided-wave-based tomography or diffraction tomography will first be recalled.

In guided elastic-wave tomography, a step of calibrating or autocalibrating the measurements is necessary, in order to obtain the best possible fit to the imaging model used and to compensate for the fact that sensor responses are in practice different from one another (for example as a result of a bond between the sensors and structure to be imaged differing depending on the sensor).

The imaging model used is based on a simple acoustic model. The guided waves are dispersive (i.e. propagation velocity of the waves depends on frequency) in the frequency range used for imaging.

The acoustic model is then expressed in the frequency domain by the Helmholtz equation:

$$\lfloor \nabla^2 + k^2 \rfloor U = 0$$

where $\nabla^2$ is the Laplacian operator, $k = \omega/c$ is the local wavenumber expressed using angular frequency $\omega$ and phase velocity c, and U is the Fourier transform of a scalar parameter of the wave field.

It is assumed that the waves obey this model.

The incident field of the guided wave is then considered (in a defect-free structure) to be equal to the free-space Green's function, which corresponds to the solution of the Helmholtz equation for a source $\delta$ corresponding to a Dirac pulse.

$$\lfloor \nabla^2 + k_0^2 \rfloor G_0(x, x_0) = \delta(x - x_0)$$

where $x_0$ and x are positions in space corresponding to the positions of the source of the emitted wave and of the measurement, respectively. This Green's function is solved in two dimensions and is equal to:

$$G_0(x, x_0) = G_0(k_0|x - x_0|) = -\frac{i}{4} H_0^{(1)}(k_0|x - x_0|)$$

where $$H_0^{(1)}$$

is the zero-order Henkel function of the first kind. The document "Green's functions for the wave, Helmholtz and Poisson equations in a two-dimensional boundless domain, 2013" describes in detail, in section 3, the demonstration leading to this result.

The expression $G_0(k_0|x - x_0|)$ is thus a propagation model of the guided wave that is used to calibrate the measurements carried out.

In the case where a reference state of the structure to be imaged is available, then the wave-field measurements taken by an emitter/receiver sensor pair may be calibrated by the following calibration coefficient C:

$$C = \frac{G_0(k_0|x - x_0|)}{\varphi_{ref}^*(x)}$$

$G_0$ is the acoustic free-space Green's function, $k_0$ is the wavenumber of the fundamental mode used to approximate the family of working modes, x is the position of the receiver in question, $x_0$ is the position of the emitter in question and $\varphi_{ref}(x)$ is the reference field measured by the receiver at a time $t_0$ when the structure is considered to be healthy. $\varphi_{ref}^*(x)$ denotes the complex conjugate of $\varphi_{ref}(x)$.

These calibration coefficients are then multiplied, one to one, by the wave fields measured, by all the pairs of sensors, at a time t when the structure is potentially damaged, in order to produce the tomograph.

Figure 8:
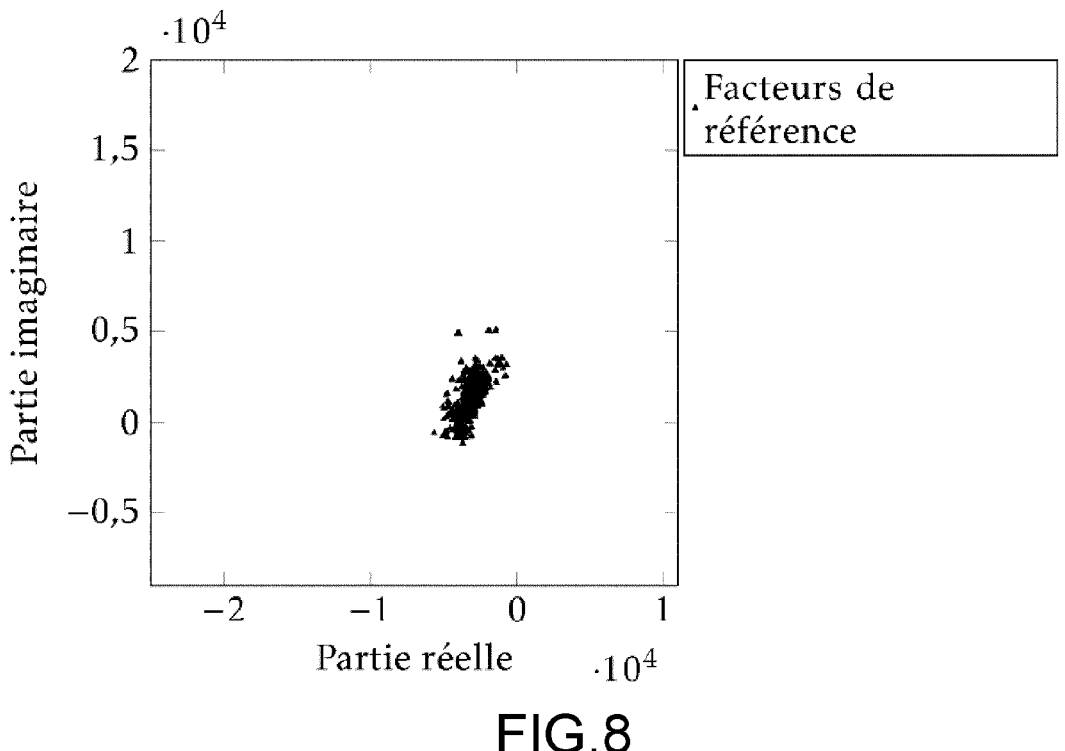
FIG. 8 shows one example of calibration coefficients obtained with a view to performing tomography with a reference state, according to a prior-art method.

By way of illustration, a cloud of calibration coefficients has been shown in FIG. 8 in the complex plane for a sheet-like structure. It may be seen in this figure that, in the complex plane, the calibration coefficients are all grouped together. This relatively concentrated distribution corresponds to a defect-free inspection zone.

The method described in the document *Autocalibration method for guided wave tomography with undersampled data* (Druet, Tastet, Chapuis, Moulin, 2019) proposes to adapt the above calibrating method to the case where no reference state of the structure is available.

In this case, the measurements are calibrated by themselves using an autocalibrating method.

In other words, the calibration coefficients are obtained using the relationship $$C = \frac{G_0(k_0|x - x_0|)}{\varphi^*(x)},$$

where $\varphi^*(x)$ is the complex conjugate of the wave field measured at the time t on a structure that, potentially, contains defects.

Figure 9:
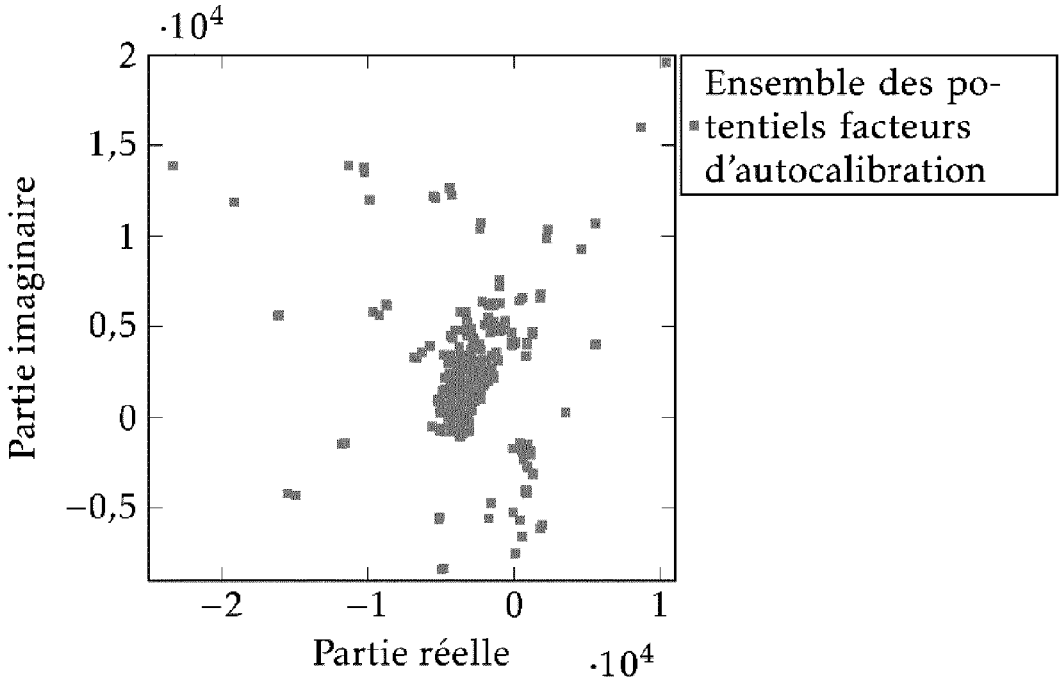
FIG. 9 shows one example of calibration coefficients obtained with a view to performing tomography without a reference state, according to a prior-art method.

FIG. 9 shows one example of calibration coefficients obtained for a sheet containing at least one defect.

A substantial number of calibration coefficients diverge from the center of the point cloud because they correspond to wave paths that encounter the defect.

The coefficients corresponding to a defect must be eliminated from the calibration process because they risk distorting the measurements. Specifically, the calibration of the measurements aims to account for sensor-related changes in the acquisition conditions, and must not include any defect-related contributions.

To identify the pairs of sensors that have produced a calibration coefficient corresponding to a defect, one method proposed in the document *Autocalibration method for guided wave tomography with undersampled data* (Druet, Tastet, Chapuis, Moulin, 2019) consists in performing time-of-flight tomography without a reference state, in order to identify paths that intercept a defect.

Figure 10:
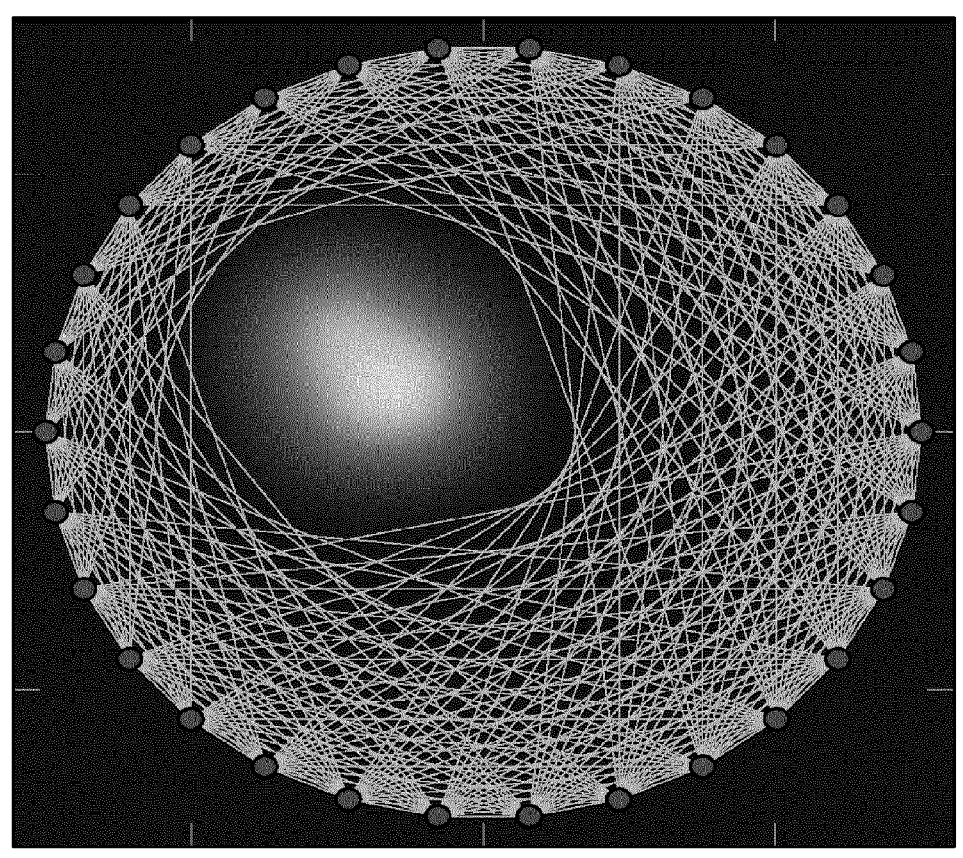
FIG. 10 illustrates a method for identifying certain healthy paths by way of a method for performing time-of-flight tomography without a reference state.

This method is illustrated in FIG. 10 for an array of sensors arranged on a circle. Only direct paths between two sensors that do not intercept the defect have been shown.

Figure 11:
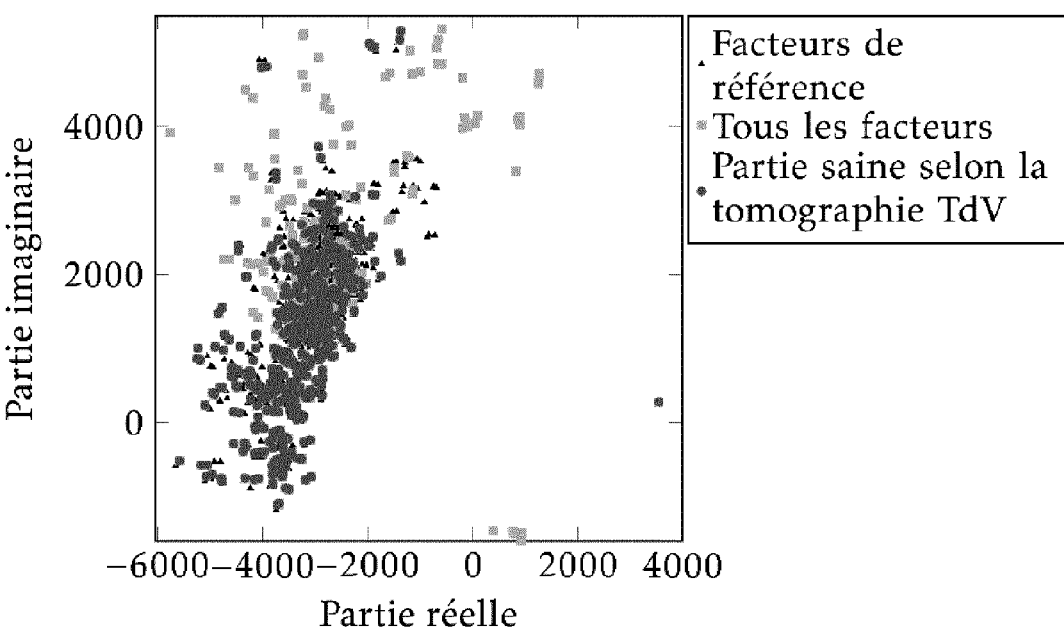
FIG. 11 illustrates identification of healthy coefficients in the graph of FIG. 9 using the method for performing time-of-flight tomography without a reference state.

FIG. 11 identifies, on the same graph as FIG. 9, calibration coefficients associated with pairs of what are referred to as "healthy" sensors, i.e. sensors for which the wave does not intercept a defect.

It may be seen that most of the coefficients that diverged from the central zone are removed after this step.

Figure 12:
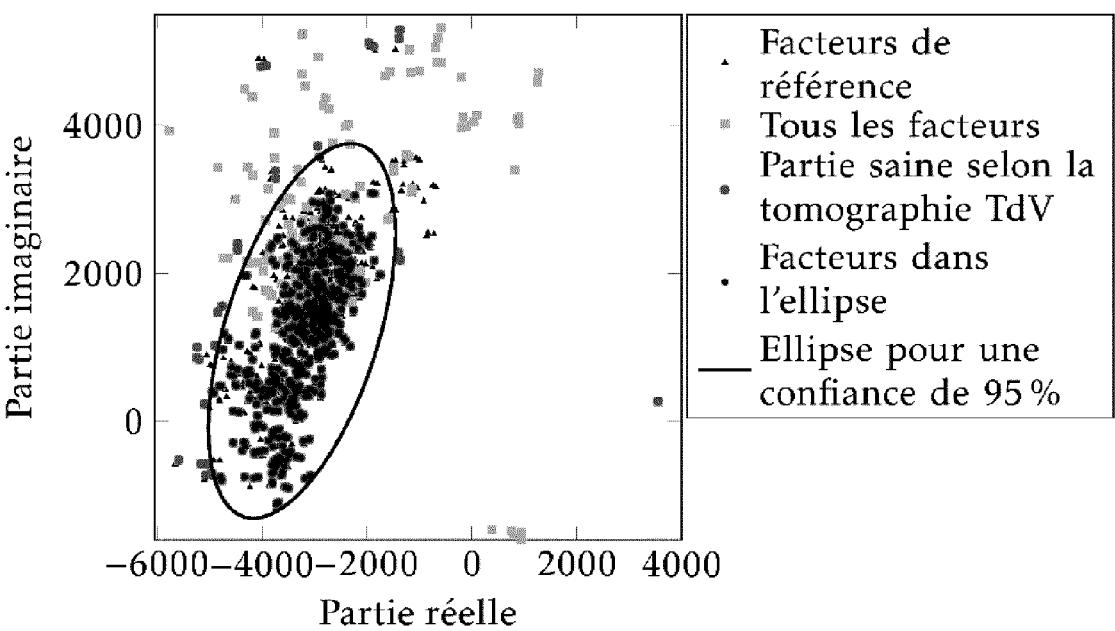
FIG. 12 illustrates a step of computing a confidence ellipse applied to the graph of FIG. 11, allowing the set of autocalibration coefficients to be used to perform tomography without a reference state to be computed.

An optional additional step consists in computing a confidence ellipse to remove the last calibration coefficients associated with a defect. Such an ellipse has been shown in FIG. 12, for 95% level of confidence.

The confidence ellipse is, for example, determined in the following way.

The calibration coefficients are complex numbers and are represented by:

$$C = \text{Re}(C) + i * \text{Im}(C) = R + i * I$$

where R and I correspond to the real part and to the imaginary part of the calibration coefficients.

It is assumed that the distribution of the calibration coefficients C in the complex plane, i.e. I as a function of R, is a normal distribution (Gaussian distribution). The confidence ellipse for a level of confidence of a % defines the region that contains a % of all retainable samples of the Gaussian distribution of the calibration coefficients.

For a chosen level of confidence a (%), an (a %) confidence ellipse with the major axis of length $2\sqrt{s\varepsilon_1}$ and the minor axis of length $2\sqrt{s\varepsilon_2}$ may be obtained, where s defines the scale of the ellipse resulting from a chosen a (%) confidence ellipse, and s is equal to a specific value obtained by computing the chi-squared likelihood. For example, a 99% confidence interval corresponds to s=9.210; a 95% confidence interval corresponds to s=5.991 and a 90% confidence interval corresponds to s=4.605. $\varepsilon_1$ and $\varepsilon_2$ represent the eigenvalues of the covariance matrix K:

$$K = \begin{bmatrix} E[(R - E[R])^2] & E[(I - E[I])(R - E[R])] \\ E[(R - E[R])(I - E[I])] & E[(I - E[I])^2] \end{bmatrix}$$

where E[.] is the expectation function.

In addition, to obtain the orientation of the ellipse, the angle that the largest eigenvector makes to the real axis (R) is computed:

$$\theta = \arctan \frac{V1_I}{V1_R}$$

where $V1(V1_R, V1_I)$ is the eigenvector of the covariance matrix K that corresponds to the largest eigenvalue.

On the basis of the length of the axes and of the orientation of the ellipse, the points C inside the confidence ellipse may be determined. These are then employed as the autocalibration coefficients. The pairs corresponding to these autocalibration coefficients are then considered to be healthy pairs, i.e. pairs for which the guided wave does not cross any potential defect.

The retained calibration coefficients are then used to calibrate the wave fields associated with the "healthy" sensor pairs.

The letter N is used to denote the set composed of n sensor pairs, n being equal to the number of potential autocalibration coefficients. Among these n coefficients, m coefficients correspond to paths that pass through a defect and that therefore diverge from the center of the point cloud corresponding to healthy coefficients. This set is denoted M.

These m coefficients are, for example, identified by time-of-flight tomography and/or the use of a confidence ellipse as described above. They are removed and so there remain n-m calibration coefficients that are considered healthy and that may be used to calibrate the data.

The wave fields measured by the sensors of the set N-M are calibrated using the retained calibration coefficients.

$\varphi_{cal}{}^{[N-m]} = C^{[N-M]} \varphi^{[N-M]*}$, where $\varphi^{[N-M]}$ is the wave field measured for a healthy sensor pair and $C^{[N-M]}$ is the associated calibration coefficient.

The wave fields corresponding to paths containing a potential defect, i.e. those measured by the sensors of the set M, are calibrated by the average of the autocalibration coefficients of the healthy pairs:

$$\varphi_{cal}{}^{[M]} = <C^{[N-M]}> \varphi^{[M]*}$$

Figure 13:
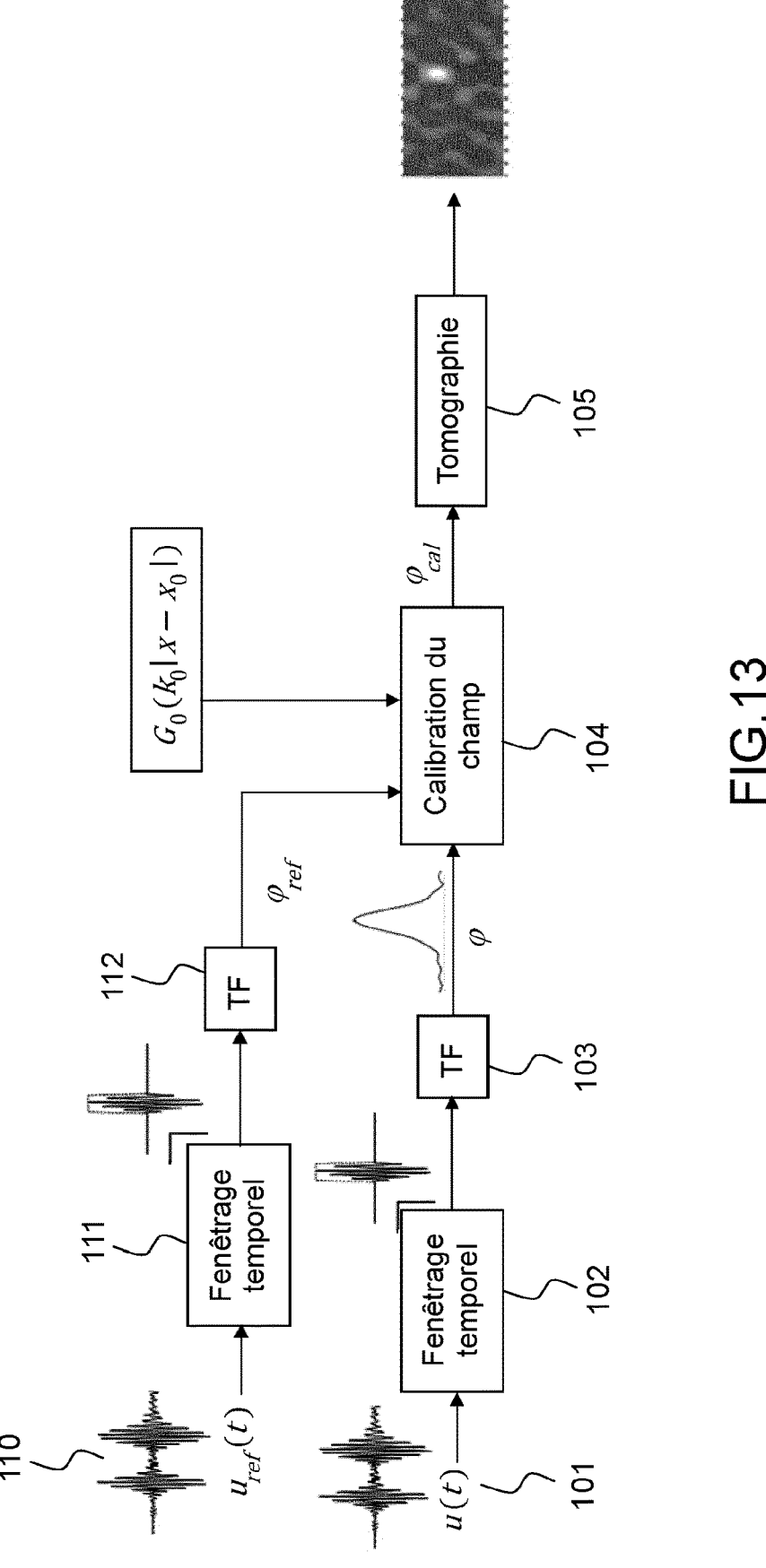
FIG. 13 shows a flowchart of a prior-art method for performing tomography with a reference state.

FIG. 13 summarizes, in a schematic, the steps of the prior-art calibrating method for guided-wave tomography with a reference state.

For each pair of sensors, a signal u(t) is measured (step 101), then time windowing 102 is applied to select a propagation mode. A Fourier transform 103 is then applied to the signal to obtain the wave field T.

The same steps 110,111,112 are applied to obtain a reference wave field $\varphi_{ref}$ corresponding to a healthy state of the structure.

A step 104 of calibrating the measured wave field is carried out using the following relationship $$\varphi_{cal}(x) = \frac{G_0(k_0|x - x_0|)}{\varphi_{ref}^*(x)} \varphi^*(x)$$

Lastly, the calibrated signals are used to perform diffraction tomography 105 on the structure.

Figure 14:
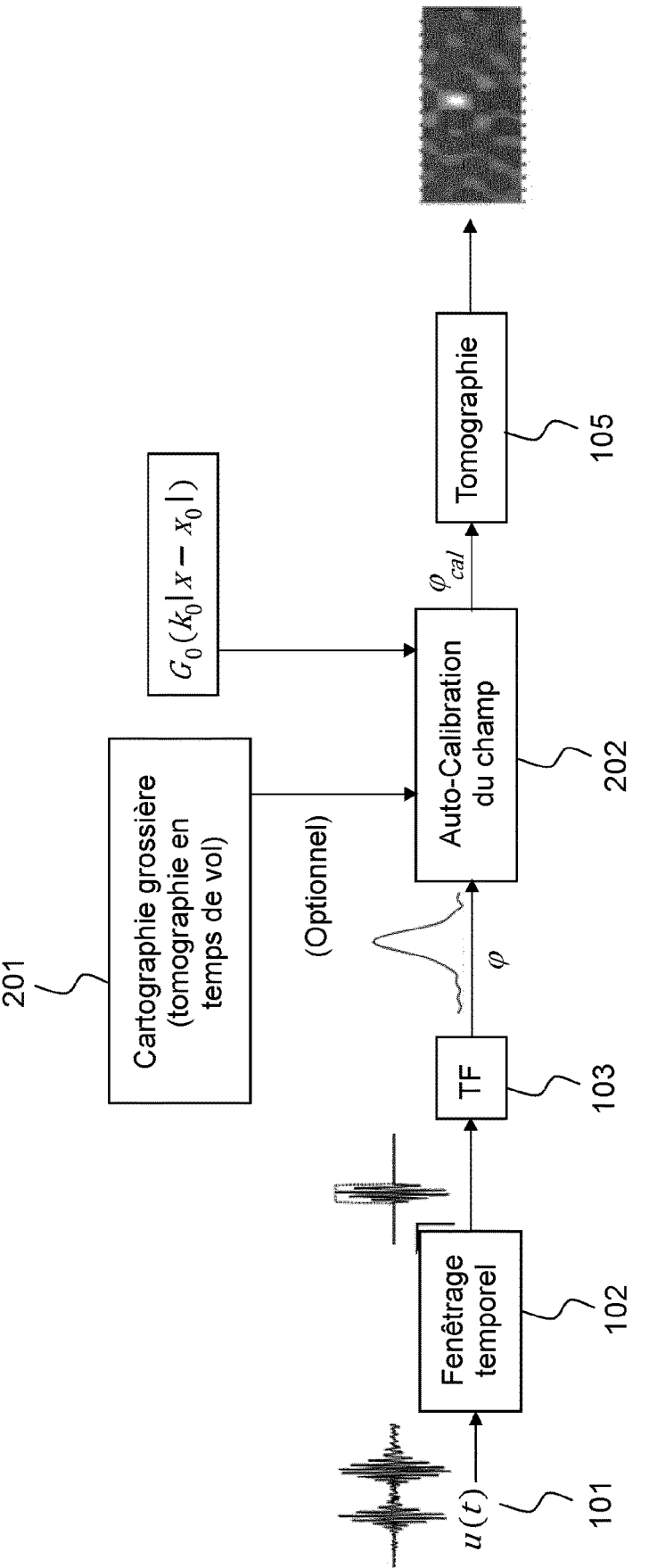
FIG. 14 shows a flowchart of a prior-art method for performing tomography without a reference state.

FIG. 14 summarizes, in a schematic, the steps of the prior-art autocalibrating method for guided-wave tomography without a reference state. Steps shared in common with FIG. 13 have been identified with the same references.

The autocalibration of the wave fields 202 is achieved in the way described above, by identifying "healthy" pairs, for example using a time-of-flight tomography method 201 or any other imaging method making it possible to obtain a coarse map of the zone to be inspected.

As indicated above, the methods illustrated in FIGS. 13 and 14 are not always applicable to structures forming cylinders of small diameter because they assume that the structure through which the waves propagate is isotropic, this not necessarily being the case for a cylinder of small diameter.

The invention proposes to adapt the prior-art calibrating methods to take into account the anisotropy of such a structure.

More specifically, the invention is applicable to structures implying anisotropic propagation of guided elastic waves. This covers the case of structures made of an anisotropic material (composite sheets for example) but also structures made of an isotropic material such as pipes but implying, because of their geometries, anisotropic propagation.

To take anisotropy into account, it is necessary to take into consideration, in the computation of the calibration coefficients, the dependence on propagation angle θ. This amounts to computing a calibration coefficient using the relationship:

$$C_\theta = \frac{G_0(k_\theta|x - x_0|)}{\varphi_{ref}^*(x)} \tag{1}$$

where $k_\theta$ is the anisotropic wavenumber associated with each propagation angle θ.

The anisotropic wavenumber may be computed via numerical solution, for example by interpolating the discrete-wavenumber dispersion curves obtained on the basis of exact solutions by simulation software. This anisotropic wavenumber may also be obtained directly using a SAFE numerical method to find an exact solution for the guided modes, SAFE being the acronym of Semi-Analytical Finite Element. In other words, one example of a possible numerical method that may be used to find a solution is a semi-analytical finite element method.

The prior-art methods may be adapted to take into account the propagation angle (with respect to the axis of the cylinder) according to various variant embodiments of the invention.

A first embodiment of the invention consists in applying a calibration with a reference state such as illustrated in FIG. 13, but with the isotropic calibration coefficients replaced with the anisotropic calibration coefficients given by relationship (1), the wavenumber $k_\theta$ being computed as a function of the direction of propagation of the wave, which depends on the orientation of the sensor pair.

A second embodiment of the invention consists in carrying out an autocalibration without a reference state such as illustrated in FIG. 14, the isotropic calibration coefficients again being replaced with anisotropic calibration coefficients, but these coefficients this time being given by the relationship:

$$C_\theta = \frac{G_0(k_\theta|x - x_0|)}{\varphi^{[N-M]^*}(x)} \tag{2}$$

N is the set composed of n sensor pairs, n being equal to the number of potential autocalibration coefficients. Among these n coefficients, m coefficients correspond to paths that pass through a defect and that therefore diverge from the center of the point cloud corresponding to healthy coefficients. This set is denoted M. N-M is therefore the set corresponding only to healthy calibration coefficients.

These m coefficients are, for example, identified by time-of-flight tomography and/or the use of a confidence ellipse as described above. They are removed and so there remain n-m calibration coefficients that are considered healthy and that may be used to calibrate the data.

$\varphi^{[N-M]*}(x)$ corresponds to the complex conjugate of the wave field for each sensor pair corresponding to a healthy path. According to this method, the wave fields corresponding to paths containing a potential defect are calibrated by the average of the autocalibration coefficients of the pairs considered to be healthy:

$$\varphi_{cal}{}^{[M]}(x) = <\frac{G_0(k_\theta|x - x_0|)}{\varphi^{[N-M]^*}(x)}> \varphi^{[M]^*}(x)$$

The other wave fields (not considered impacted by the defect) are calibrated directly by their respective calibration coefficient as given by relation (2), considering only the n-m calibration coefficients considered healthy.

$$\varphi_{cal}{}^{[N-M]}(x) = \frac{G_0(k_\theta|x - x_0|)}{\varphi^{[N-M]^*}(x)} \varphi^{[N-M]^*}(x)$$

A variant of this second embodiment consists in calibrating all the wave fields (for all the sensor pairs) by the average of the calibration coefficients computed for the healthy pairs.

$$\varphi_{cal}^{[N]}(x) = \ < \frac{G_0(k_\theta |x - x_0|)}{\varphi^{[N-M]^*}(x)} > \varphi^{[N]^*}(x).$$

The first and second embodiments of the invention are applicable only if the diffraction tomography algorithm 105 is compatible with anisotropic operation, i.e. only if it takes into account the dependence of the wave fields on the direction of propagation of the wave.

A third embodiment of the invention is proposed in the case where the diffraction tomography algorithm 105 is intended for isotropic operation and in the case where no reference state is used. In this case, it is further necessary to correct all the wave fields (after calibration) with a corrective factor $$\frac{G_0(k_0 |x - x_0|)}{G_0(k_\theta |x - x_0|)},$$

in order to remain compatible with the isotropic model used for the tomography.

In the case where a reference state is used, it is not useful to add this corrective factor because if it is added the calibration coefficient is simplified and the prior-art anisotropic solution obtained:

$$\varphi_{cal}^{[N]}(x) = \frac{G_0(k_\theta |x - x_0|)}{\varphi_{ref}^{[N]^*}(x)} \frac{G_0(k_0 |x - x_0|)}{G_0(k_\theta |x - x_0|)} \varphi^{[N]^*}(x)$$

$$\varphi_{cal}^{[N]}(x) = \frac{G_0(k_0 |x - x_0|)}{\varphi_{ref}^{[N]^*}(x)} \varphi^{[N]^*}(x)$$

Figure 15A:
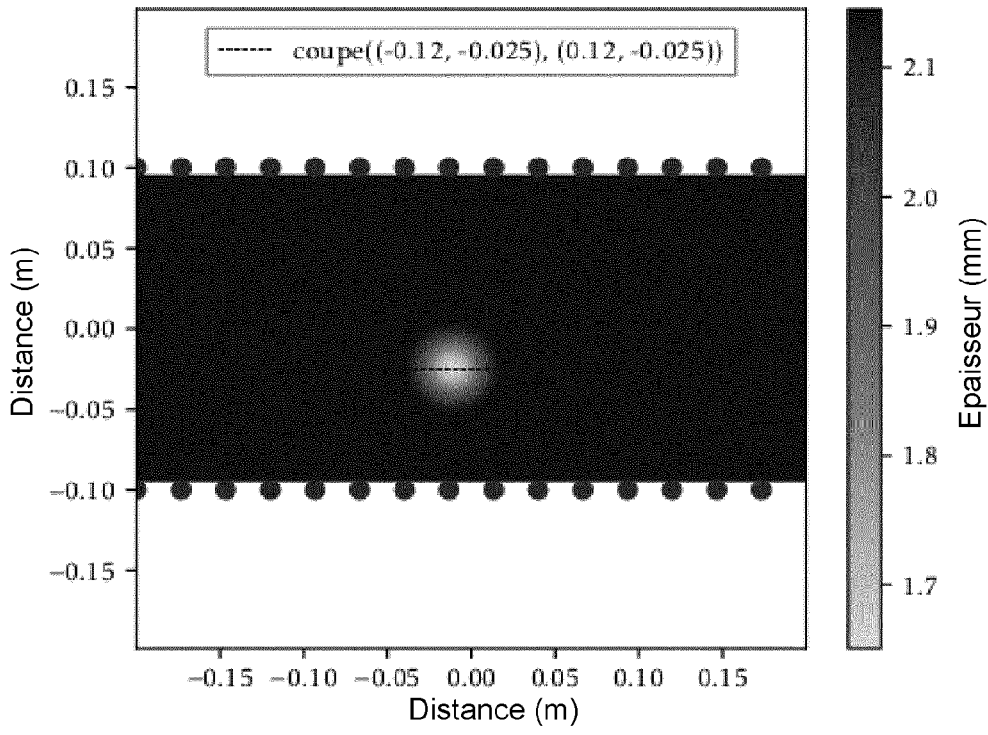
FIG. 15a shows a reference image of a cylindrical structure containing a defect.
Figure 15B:
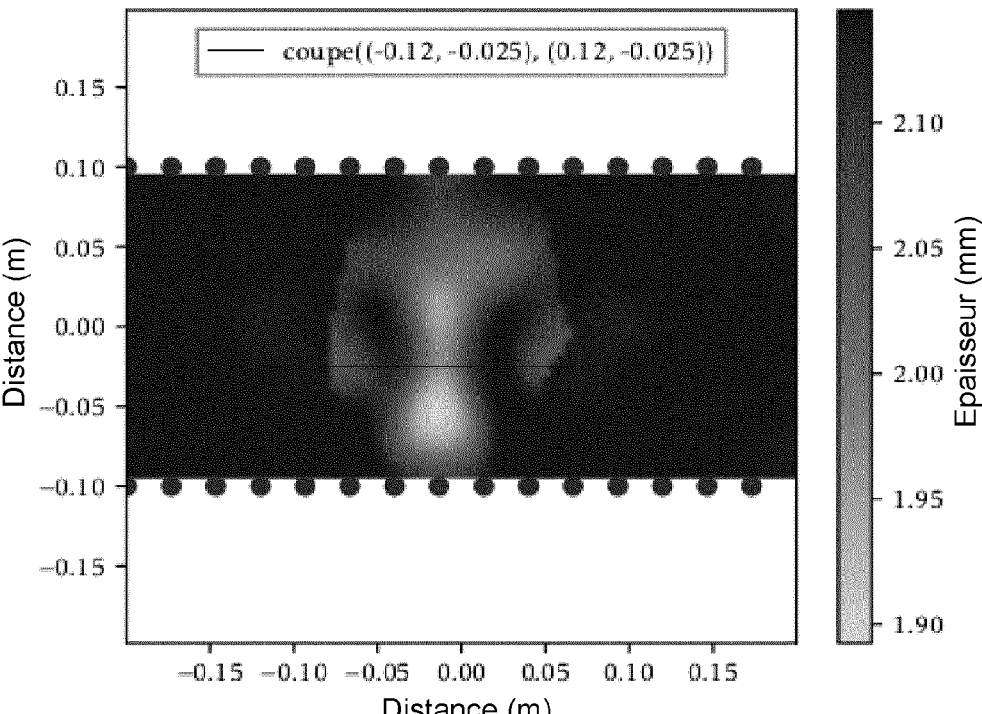
FIG. 15b represents a tomography image of the structure of FIG. 15a obtained with a prior-art autocalibrating method.
Figure 15C:
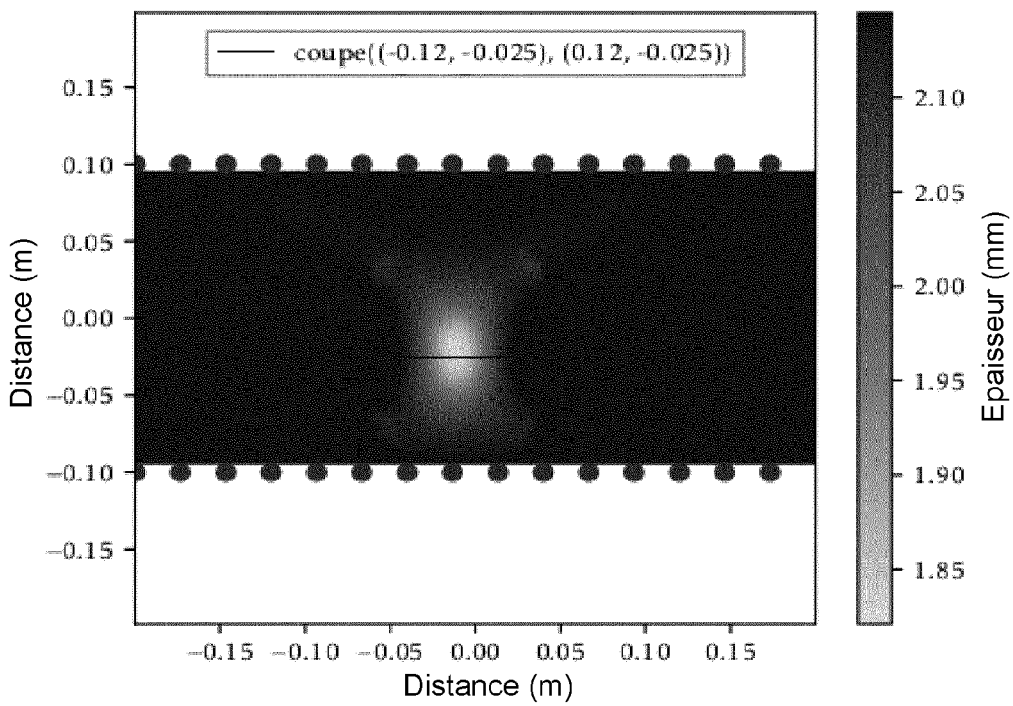
FIG. 15c represents a tomography image of the structure of FIG. 15a obtained with an autocalibrating method according to one embodiment of the invention.

FIGS. 15a, 15b, 15c illustrate a result obtained, for one example, using the method according to the invention.

FIG. 15a is a reference image (showing the defect to be imaged by tomography) of a stainless-steel cylinder with a median diameter of 127.145 mm and a thickness of 2.145 mm. The inspection frequency was 30 kHz. The working wavelength for the family of modes F(m,1) approximated by L(0.1) was thus 26.7 mm.

The image is shown in rolled-out form, the circles correspond to the positions of the sensors.

FIG. 15b shows the tomograph obtained using a prior-art isotropic autocalibrating method.

FIG. 15c shows the tomograph obtained using an anisotropic autocalibrating method according to the third embodiment of the invention.

It may be seen from these two figures that the defect of the reference image is better reconstructed in FIG. 15c than in FIG. 15b.

Figure 16:
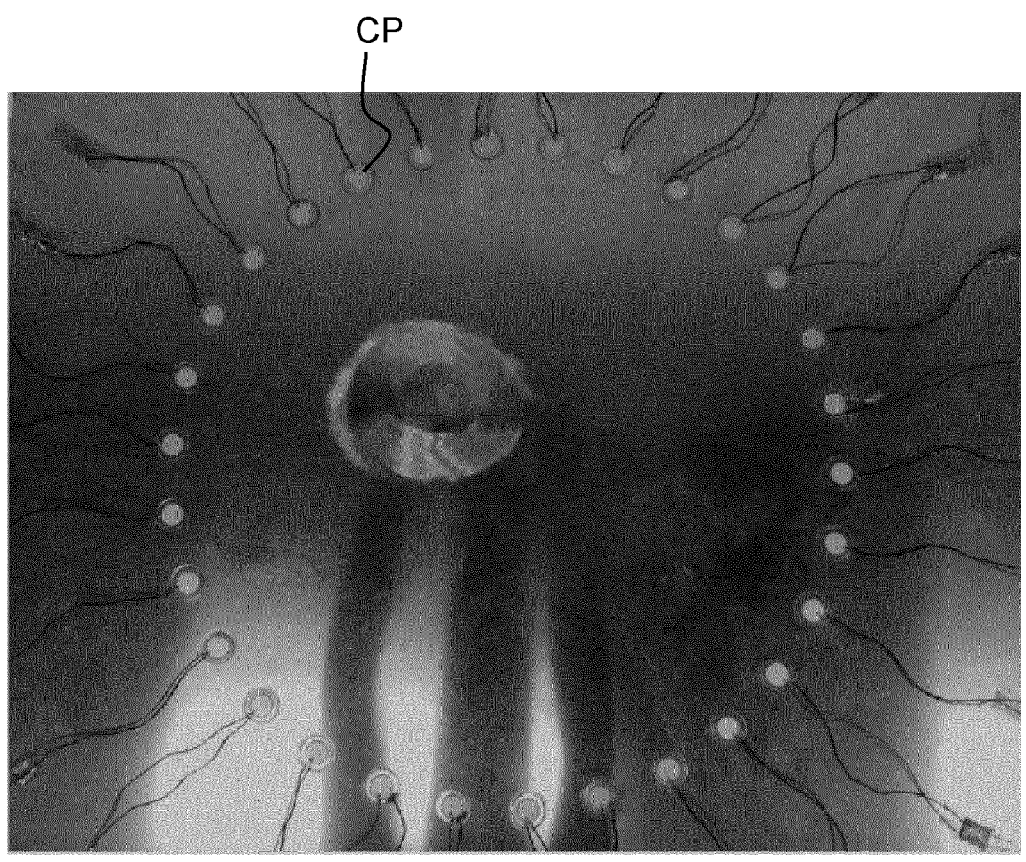
FIG. 16 shows a format of a device for performing tomography implementing the invention.

FIG. 16 schematically shows an array of sensors CP arranged on a structure to be imaged. Each sensor is able to emit a guided elastic wave and to acquire a wave emitted by another sensor after its propagation through the structure.

The sensors are chosen from piezoelectric transducers, electromagnetic acoustic transducers (EMATs) and fiber-Bragg-grating sensors.

Each sensor is connected to a signal-acquiring chain and all of the sensors are connected to a processing unit (not shown in FIG. 16) that is configured to execute the method for performing tomography according to one of the embodiments of the invention.

The processing unit may take software form and/or hardware form based on a processor and a memory. The processor may be a generic processor, a specific processor, an application-specific integrated circuit (ASIC) or a field-programmable gate array (FPGA).

The results delivered by the processing unit may be displayed on a computer screen or directly on an interface forming part of the device.

To image an inspection zone of a cylinder-like structure, the sensors are preferably arranged with a spacing of one half-wavelength between two neighboring sensors around a closed zone, but they may also be arranged differently. For example, the sensors are positioned in two rings around the circumference of the cylinder.

The invention is compatible with so-called active methods in which each sensor emits a wave in the direction of all the other sensors, which receive this wave after its propagation.

The invention is also compatible with so-called passive methods in which the sensors only operate in acquisition mode, the signal being generated by ambient noise.

The diffraction-tomography-based imaging method used to perform step 105 of the invention is, for example, one of the methods described in the document "*Tomographie passive par ondes guidées pour des applications de contrôle santé intégré* [Passive guided-wave tomography for integrated-health-monitoring applications], Tom Druet, thesis submitted 18 May 2018", for example a HARBUT method (HARBUT standing for Hybrid Algorithm for Robust Breast Ultrasound Tomography).

Figure 17A:
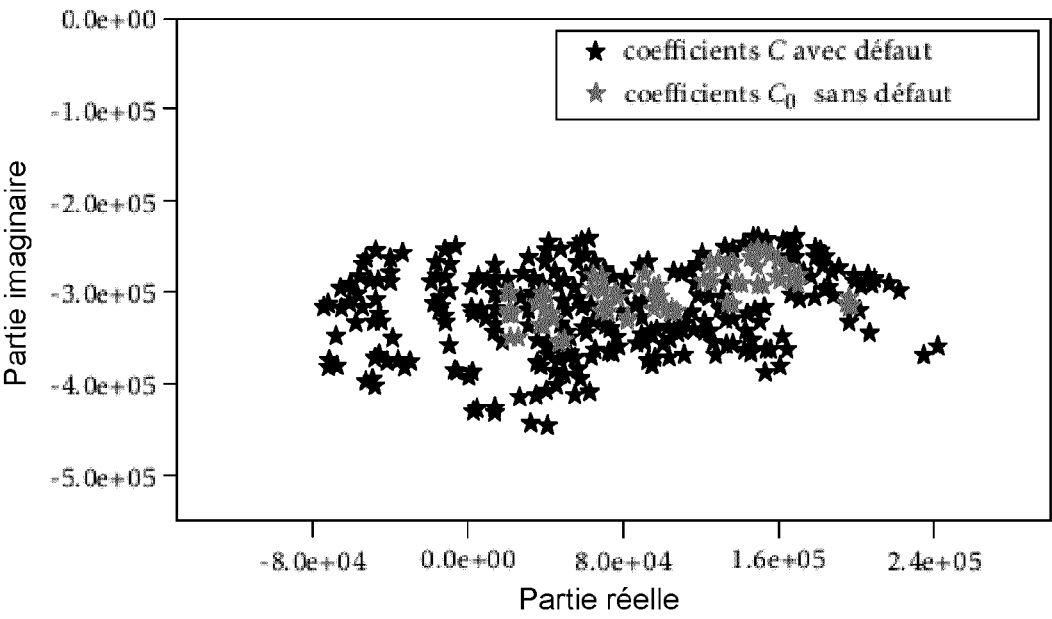
FIG. 17a shows a graph of complex calibration coefficients for a cylindrical structure obtained using a prior-art calibrating method.
Figure 17B:
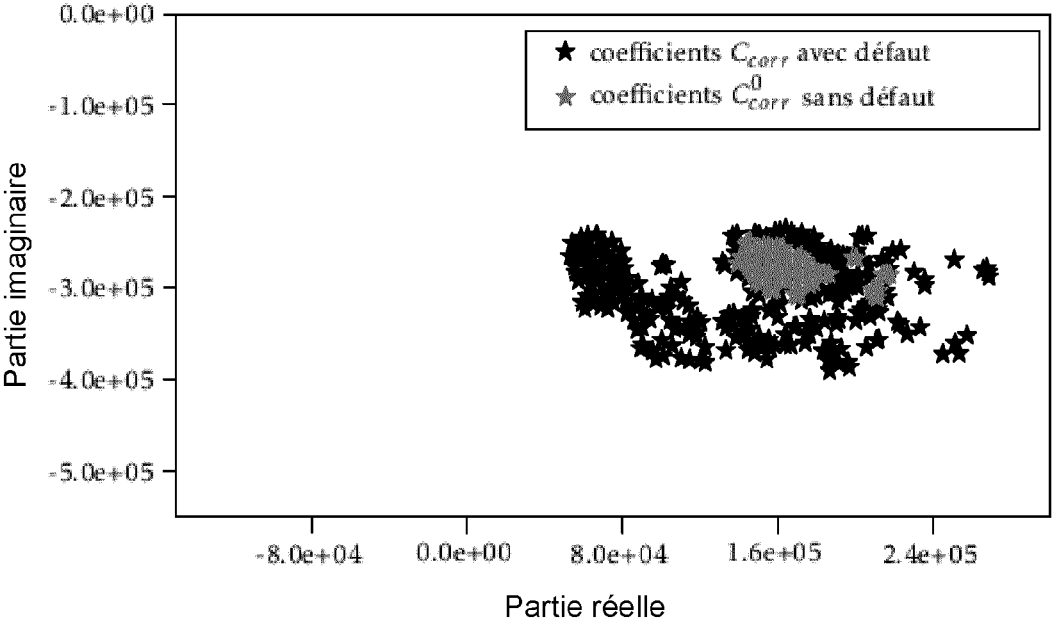
FIG. 17b shows the same type of graph as FIG. 17a but with the calibrating method according to the invention employed.

FIGS. 17a and 17b show, in the complex plane, a set of calibration coefficients obtained for a cylindrical structure with a prior-art method (FIG. 17a) and with the method according to the invention (FIG. 17b), respectively.

In FIG. 17a, all of the calibration coefficients obtained by applying the prior-art calibrating method described in "*Autocalibration method for guided wave tomography with undersampled data* (Druet, Tastet, Chapuis, Moulin, 2019)", i.e. a method that does not take into account the anisotropic wavenumber when computing the calibration coefficients, have been shown.

FIG. 17a shows the set of the calibration coefficients C0 associated with the sensor pairs said to be "healthy", i.e. those for which the wave does not intercept a defect, and the set of calibration coefficients C associated with the sensor pairs for which the wave intercepts a defect.

It may be seen that the calibration coefficients are grouped in localized bunches in the complex plane. Each bunch corresponds to one propagation angle. This effect is due to the error that results from the choice of an isotropic wavenumber $k_0$ (simplified prior-art model) rather than the real wavenumber, which is in fact anisotropic and which therefore depends on the angle of propagation $\theta$. Specifically, the larger the angle $\theta$, the larger the error between $k_0$ and $k(\theta) = k_\theta$.

This dispersion of the calibration coefficients into "bunches" associated with different propagation angles leads to an image of poor quality such as illustrated in FIG. 15b.

FIG. 17b shows the calibration coefficients obtained by applying the method according to the invention.

FIG. 17b shows the set of the calibration coefficients $C0_{corr}$ associated with the sensor pairs said to be "healthy", i.e. those for which the wave does not intercept a defect, and the set of calibration coefficients $C_{corr}$ associated with the sensor pairs for which the wave intercepts a defect.

It may be seen that, this time, contrary to FIG. 17*a*, all the healthy calibration coefficients $C0_{corr}$ are grouped together in the same point cloud in the complex plan, this being a sign that the anisotropy of propagation has been taken into account correctly. The autocalibration may then be carried out on the coefficients $C_{corr}$ without making an error in the selection of the healthy coefficients $C0_{corr}$.

The invention claimed is:

1. A diffraction tomographic method for imaging a structure supporting guided elastic wave propagation modes, the method comprising the steps of:

measuring a plurality of signals propagating through the structure with a plurality of pairs of non-collocated elastic-wave sensors;

for each pair of elastic-wave sensors, i. selecting one guided elastic wave propagation mode, ii. converting the measured signals into wave fields for the selected guided elastic wave propagation mode, iii. determining an anisotropic calibration coefficient from a wave-field propagation model evaluated depending on an anisotropic wavenumber, a distance between the elastic-wave sensors of the pair, and said wave fields or a reference wave field corresponding to a healthy state of the structure;

calibrating the wave fields using the determined calibration coefficients;

performing diffraction tomography on the structure from the calibrated wave fields; and displaying, on an interface, an image of the structure obtained from the diffraction tomography.

2. The method for performing tomography on a structure of claim 1, wherein the anisotropic calibration coefficient is equal to the ratio between the wave-field propagation model and the reference wave field and the calibrating step is carried out by multiplying each wave field by the associated anisotropic calibration coefficient.

3. The method for performing tomography on a structure of claim 1, wherein:

the anisotropic calibration coefficient is equal to the ratio between the wave-field propagation model and the measured wave field, the method further comprising a step of identifying pairs of sensors for which the measured signal corresponds to a path that does not intercept a defect in the structure, these pairs being designated healthy pairs, the calibrating step being carried out by multiplying each wave field by the average of the anisotropic calibration coefficients computed for the healthy pairs.

4. The method for performing tomography of claim 3, wherein the step of performing diffraction tomography is compatible with an anisotropic structure.

5. The method for performing tomography of claim 3, wherein the calibrating step further comprises:

computing a corrective factor equal to the ratio between the wave-field propagation model evaluated as a function of the isotropic wavenumber of the fundamental mode and the wave-field propagation model evaluated as a function of the anisotropic wavenumber, multiplying each calibrated wave field by the associated corrective factor.

6. The method for performing tomography of claim 5, wherein the step of performing diffraction tomography is compatible with an isotropic structure.

7. The method for performing tomography of claim 3, wherein the step of identifying healthy pairs is carried out by means of time-of-flight tomography imaging.

8. The method for performing tomography of claim 3, further comprising determining a confidence ellipse on the basis of the set of calibration coefficients computed for the healthy pairs, pairs corresponding to calibration coefficients located outside the confidence ellipse being excluded from the healthy pairs.

9. The method for performing tomography on a structure of claim 1, wherein:

the anisotropic calibration coefficient is equal to the ratio between the wave-field propagation model and the measured wave field, the method further comprising a step of identifying pairs of sensors for which the measured signal corresponds to a path that does not intercept a defect, these pairs being designated healthy pairs, the calibrating step being carried out by multiplying each wave field corresponding to a healthy pair by the associated anisotropic calibration coefficient and by multiplying the other wave fields by the average of the anisotropic calibration coefficients computed for the healthy pairs.

10. The method for performing tomography of claim 1, wherein the wave-field propagation model is given by a solution of the Helmholtz equation for a pulsed emitter source that depends on the product between the wavenumber and the distance between the sensors of a pair.

11. The method for performing tomography of claim 1, wherein the anisotropic wavenumber is determined via numerical solution on the basis of the direction of propagation of the wave associated with the pair of sensors.

12. The method for performing tomography of claim 1, wherein the structure is a cylinder.

13. A device for performing tomography, comprising an array of elastic-wave sensors (CP) that are intended to be positioned on a surface of a structure to be imaged and a processing unit that is configured for:

receiving signals measured by the elastic-wave sensors;

measuring a plurality of signals propagating through the structure with a plurality of pairs of non-collocated elastic-wave sensors;

for each pair of elastic-wave sensors, i. selecting one guided elastic wave propagation mode, ii. converting the measured signals into wave fields for the selected guided elastic wave propagation mode, and iii. determining an anisotropic calibration coefficient from a wave-field propagation model evaluated depending on an anisotropic wavenumber, a distance between the elastic-wave sensors of the pair, and said wave fields or a reference wave field corresponding to a healthy state of the structure;

calibrating the wave fields using the determined calibration coefficients;

performing diffraction tomography on the structure from the calibrated wave fields; and displaying, on an interface, an image of the structure obtained from the diffraction tomography.

14. The device for performing tomography of claim 13, wherein the elastic-wave sensors (CP) are chosen from piezoelectric transducers, electromagnetic acoustic transducers and fiber-Bragg-grating sensors.

15. The device for performing tomography of claim 13, wherein the elastic-wave sensors (CP) are able to operate in a so-called active or passive acquisition mode.

* * * * *